US007039993B1

(12) United States Patent
Smith et al.

(10) Patent No.: US 7,039,993 B1
(45) Date of Patent: May 9, 2006

(54) SEAL PULLER WITH ADJUSTABLE HEAD

(75) Inventors: Jeffrey C. Smith, Big Lake, MN (US); Randall J. Ploeger, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 11/055,336

(22) Filed: Feb. 10, 2005

(51) Int. Cl.
*B23P 19/02* (2006.01)

(52) U.S. Cl. ............................ 29/235; 29/270; 254/25

(58) Field of Classification Search .................. 29/235, 29/242–243, 270, 278; 254/25, 26 R
See application file for complete search history.

(56) References Cited

U.S. PATENT DOCUMENTS

| | | | | | |
|---|---|---|---|---|---|
| 307,544 | A | * | 11/1884 | Hardwick | 254/25 |
| 1,709,240 | A | * | 4/1929 | Wass | 254/25 |
| 5,871,204 | A | * | 2/1999 | Spirer | 254/26 R |
| 2004/0069978 | A1 | * | 4/2004 | Whelan | 254/25 |

OTHER PUBLICATIONS

California Tool Co. Catalog, 1998, p. 652, Section 57, K-D Seal Puller, #3245; Lisle Seal Puller, #56750; Rimac Seal Puller, #0145; ATD Seal Puller, #5490; Cal-Van Seal Puller, #490.
Invention Disclosure Agreement, Mark Goetz, Sep. 14. 1989, Seal Puller.
Invention Disclosure Agreement, Joe M. Bidwell, Jan. 29, 1990, Seal Hook.
Invention Disclosure Agreement, Keishi Sunakawa, Mar. 25, 2000, Mini Seal Puller with Adjustable Angle.
Invention Disclosure Agreement, Kris A Henke, Feb. 11, 2003, Modified Adjustable Seal Puller.

* cited by examiner

*Primary Examiner*—Lee D. Wilson
(74) *Attorney, Agent, or Firm*—Banner & Witcoff, Ltd.

(57) ABSTRACT

A tool for pulling or removing seals includes an elongate handle having a manual engagement end and a seal hook member attachment end with a seal hook member pivotally attached to the seal hook member attachment end. The seal hook member includes at least one hook element and a mechanism for pivotally adjusting and fixing the pivotal relationship of the seal hook member with the elongate handle member.

15 Claims, 3 Drawing Sheets

FIG. 4
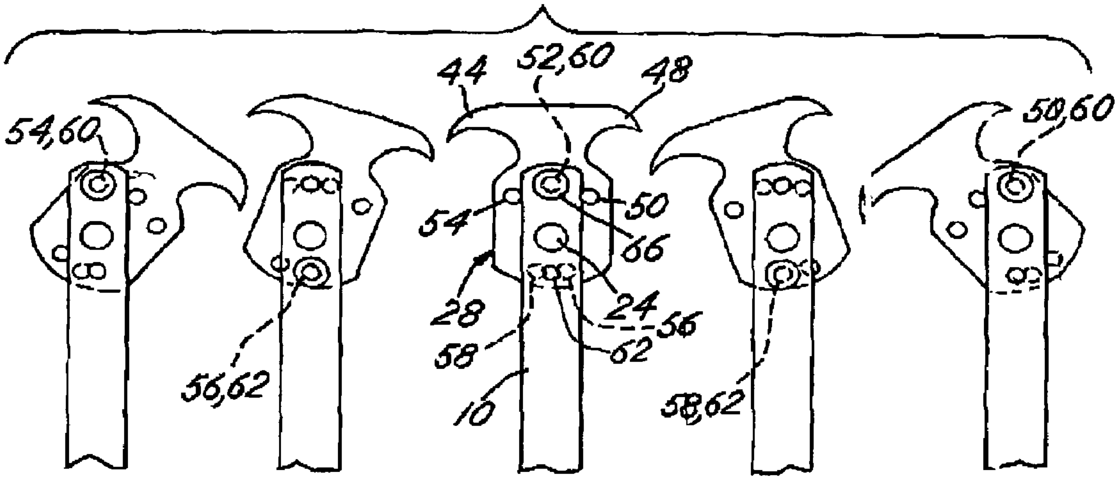
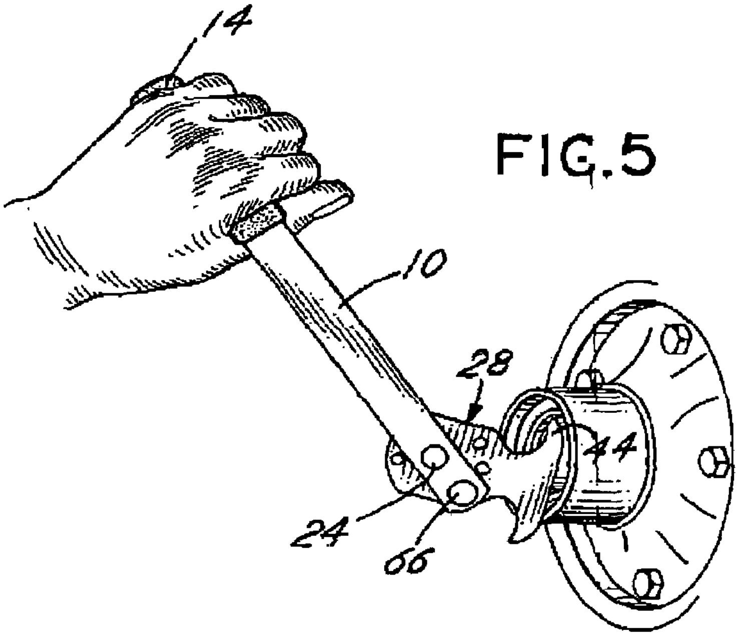
FIG. 5

SEAL PULLER WITH ADJUSTABLE HEAD

BACKGROUND OF THE INVENTION

In a principal aspect, the present invention relates to a tool which is useful for removal of seals, such as seals utilized on vehicle drive transaxles, engine crankshaft seals and the like.

Heretofore, Lisle Corporation has made available a fixed head seal puller, Product No. 56750. This tool is used to facilitate the removal of seals, for example, seals used in combination with or in association with vehicle front wheel drive transaxles, engine crankshafts and the like. The tool thus has applicability for automobile repair. The fixed head seal puller is generally successful commercially as a tool for use by automobile mechanics and the like.

However, with the advent of multiple sizes and types of bearing mechanisms which are utilized in combination with seals, the extent of utilization of the aforesaid prior art tool has been somewhat limited. The tool, thus, does not have universal application for all sizes of seals. Moreover, the tool has limited capability for use in restricted access areas in an engine compartment, for example. Thus, there has developed the need for an improved seal puller which has a broader range of capability. This desire, among others, led to the development of the present invention.

SUMMARY OF THE INVENTION

Briefly, the present invention comprises a tool for facilitating removal of seals and which has adjustment features so that it may be utilized in a number of work environments and with respect to seals of a wide variety of sizes and configurations. The tool includes an elongate handle that can be manually gripped at one end and includes a seal hook member pivotally attached to the opposite end. The seal hook member may include one or more hooks or hook elements, but includes at least one hook element. The seal hook member is pivotally adjustable relative to the handle and thus includes a mechanism for engaging and connecting the seal hook member to the elongate handle member in any one of a number of desired, fixed orientations. The orientation adjustment capability of the tool enables at least two adjustable orientations. In a preferred embodiment, upwards of five adjustable orientations are available and upwards of two or more hook elements are included on the seal hook member.

In use, the tool is adjusted by orienting the seal hook member in a desired fashion relative to the elongate handle and then the hook element may be engaged with a seal and manually actuated to facilitate disengagement of the seal from its associated seal seat.

Thus, it is an object of the invention to provide an improved tool for pulling seals and removing seals from a seated position in a mechanical device.

It is a further object of the invention to provide a tool for pulling a seal wherein the tool is adjustable and includes various sized hook elements for engaging a seal and further is adjustable in orientation to facilitate the utilization of the tool.

Another object of the invention is to provide a tool for pulling or removing seals wherein the tool is comprised of generally flat planar elements including an elongate handle and a seal hook member.

Another object of the invention is to provide a tool for pulling seals which provides the user with a mechanical advantage in efforts to remove a seal from its associated seat.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 4 is a plan view of the tool of FIG. 1 illustrating the various alternative positions of the embodiment depicted inasmuch as the hook member may be adjusted with respect to the elongate handle member; and FIG. 5 is an isometric view of the tool of the invention wherein the tool has been set in a fixed position and illustrating the manner of use of the tool.

DESCRIPTION OF THE PREFERRED EMBODIMENT

Figure 1:
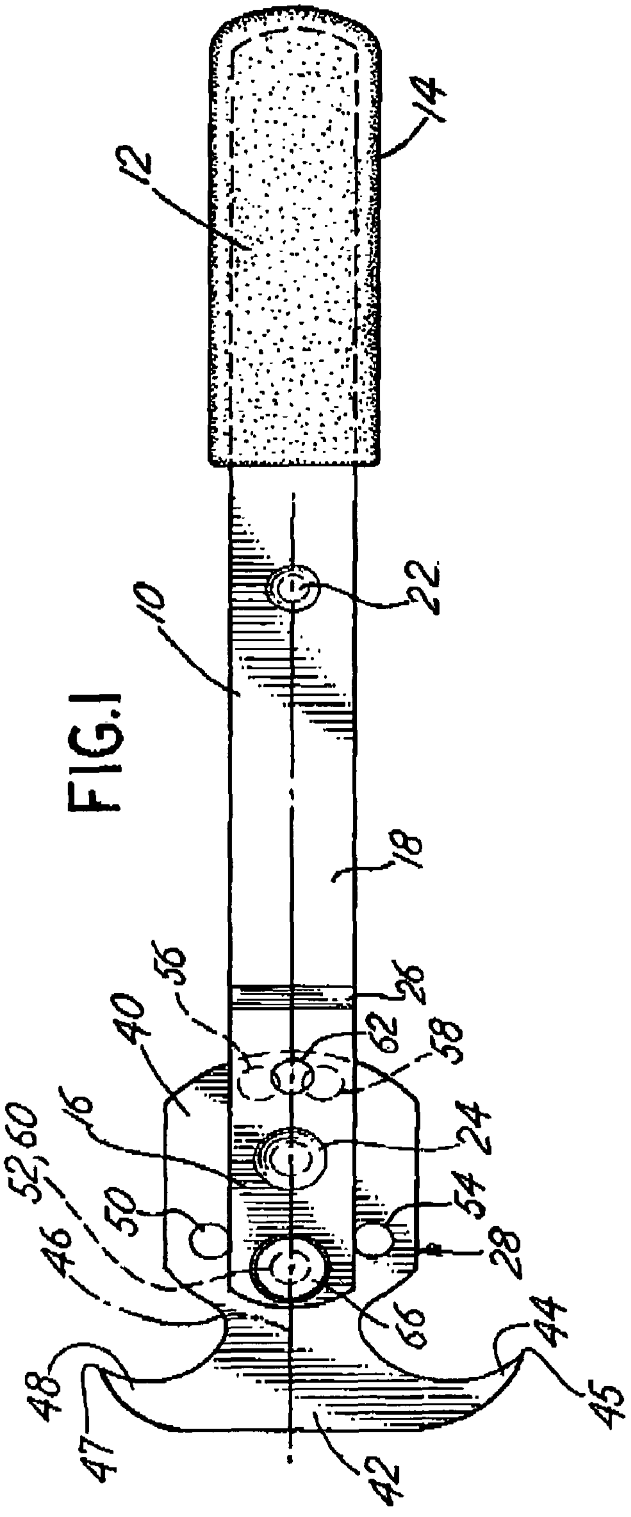
FIG. 1 is a plan view of the tool of the invention.
Figure 2:
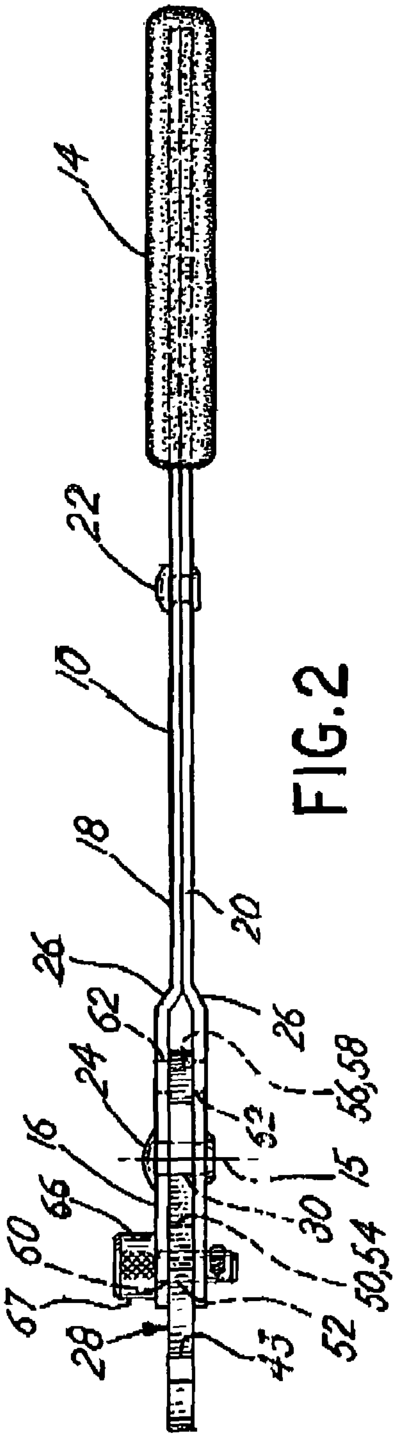
FIG. 2 is a side view of the tool of FIG. 1.
Figure 3:
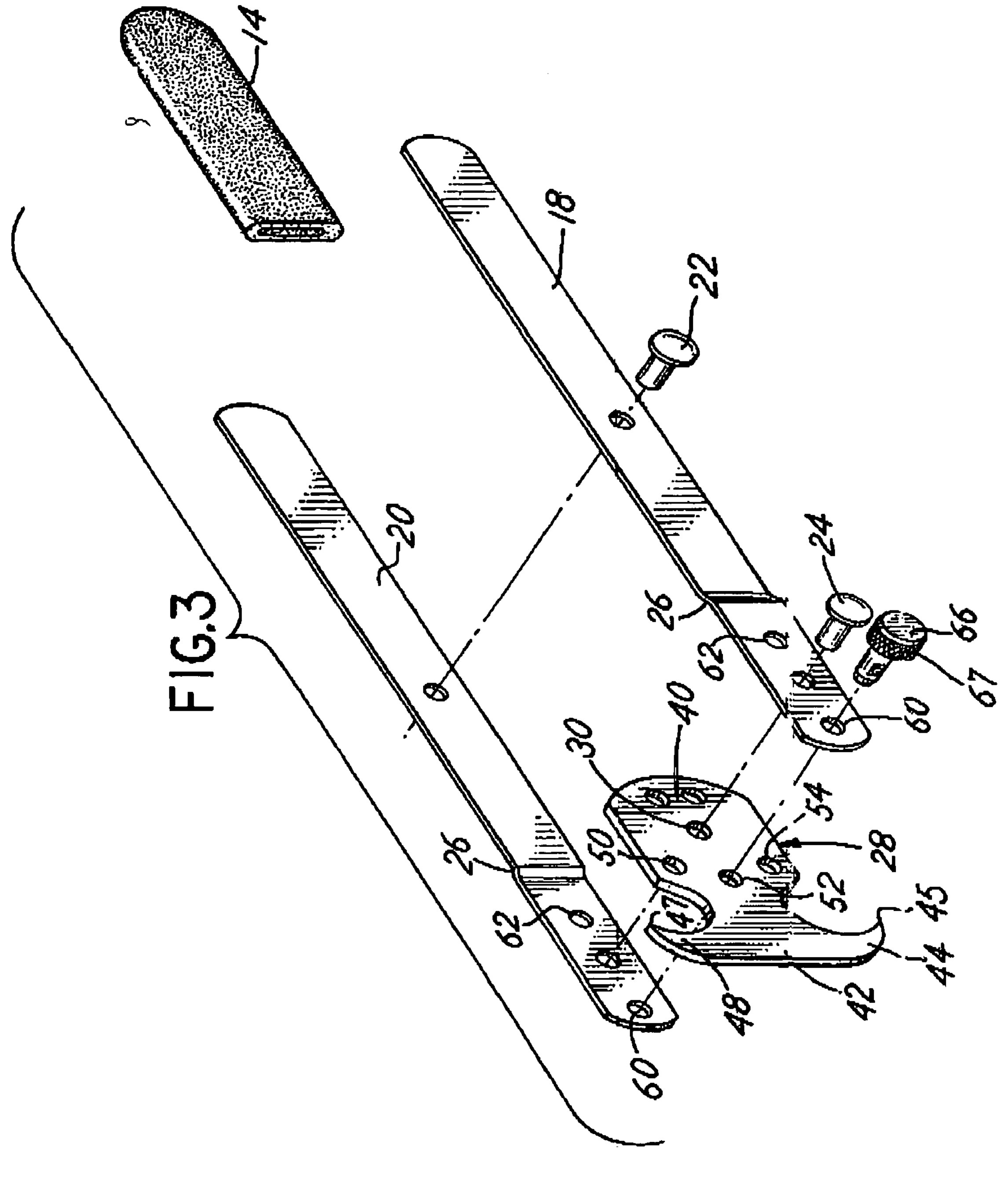
FIG. 3 is an exploded isometric view of the component parts forming the tool of the invention.

Referring to the figures, the tool of the invention is comprised of an elongate handle 10 having a manual engagement end 12 with a vinyl or foam grip 14 molded thereon. The opposite end of the handle 10 comprises a seal, hook member attachment end 16. In practice, the elongate handle 10 is comprised of first and second planar, elongate bars or plate members 18 and 20 which are joined together by rivets 22 and 24. The elongate members 18 and 20 each include an angled section 26 so that, when joined together, the seal hook member attachment end 16 defines a gap or space into which a seal hook member 28 may be positioned. The seal hook member 28 includes a throughpassage 30 through which the rivet 24 fits and about which the seal hook member 28 may pivot. The seal hook member thus is pivotally connected by means of a pivot connection to the attachment end 16 of the elongate handle 10.

The seal hook member 28 is comprised of a planar plate section 40 and a forward head or hook section 42. The hook section 42 of hook member 28 includes a first hook element 44 extending laterally from a longitudinal axis 46 in a first direction and a second hook element 48 extending in the opposite direction from the longitudinal center line axis 46. The longitudinal center line axis 46 passes through the center of the pivot opening 30 in the head element 28. Each of the hook elements 44 and 48 are configured to include a seal engagement point or probe 45 and 47, respectively. Each of the hook elements 44 and 48 is preferably uniquely sized relative one to the other so as to enable engagement of the point or probe 45 and/or 47 with a seal to facilitate removal of the seal.

The body portion 40 of the head 42 includes a plurality of openings, such as openings 50, 52, 54, 56 and 58. The openings 50, 52, and 54 are at equal radial distances from the center line of the pivot 30. Similarly, the radial distance of the openings or passages 56 and 58 are at equal radial distances from the center of the pivot opening 30 or the rivet 24. The head, thus, may be pivoted about the rivet or pin 24 to align openings 50, 52 or 54 with a throughpassage 60 or to align the openings 56 or 58 with a throughpassage 62. Thus, passage 60 is at an equal radial distance from pivot 30 to the radial distance of openings 50, 52, 54. Passage 62 is at an equal radial distance from pivot 30 as openings 56, 58.

A detent pull pin 66 is provided to fit through either passage 60 or passage 62 to thereby engage or pass through any of the openings 50, 52, 54 with respect to passage 60 or openings 56 and 58 with respect to passage 62. Thus, removal of the detent pull pin 66 and pivoting of the head 40 permits alignment of a desired passage in the head 40 with a desired opening in the seal hook member attachment end 16 of the elongate handle 10. In this manner, the seal hook member 28 may be aligned in any of a number of orientations with respect to the elongate handle 10. In the embodiment shown, there are at least five different orientations of the seal hook member 28 with respect to the elongate handle 10.

Of course, additional openings permitting additional orientations of the respective component parts 10 and 28 may be utilized. Additionally, the elongate handle 10 may include a plate with radially spaced openings relative to the pivot point 30 for coaction with openings provided in a seal hook member 28. In other words, the arrangement of the elements may be reversed or expanded from that depicted, for example, in FIG. 1 insofar as the interaction of the various openings and the positioning of openings in the handle 10 and hook element member 28.

In the preferred embodiment, the component parts forming the tool are generally flat, planar metal plate members. Further in a preferred embodiment, the handle member 10 is preferably an elongate member having longitudinal axis 46 which is straight and elongate. However, the handle 10 may be constructed with various configurations and may also be bent at an angle with respect to the plane of the members forming the handle element 10. Thus, in a preferred embodiment, the handle element 10 comprises a straight linear axis 46, although other arrangements are possible.

The detent pull pin 66 is constructed so that it may be snap fitted into the openings described and retained therein by means of a detent mechanism. The detent pull pin includes a head 67 which may be manually gripped to facilitate positioning the pull pin 66.

In the preferred embodiment, the fixed rivet or pivot pin 24 lies on the axis 46. However, it is possible to adjust the position of the fixed pivot pin 24 and make it non-axial.

FIGS. 4 and 5 illustrate the various positions and the use of the tool of the invention. That is, in use, a desired orientation of the handle 10 and the hook element member 28 is set by use of the detent pin 66 and the various openings as previously described. Thereafter, a hook element, such as hook element 44 or 48, is positioned by the mechanic or user of the tool in a manner so that it will engage with a seal to be pulled from its seat. FIG. 5 illustrates this utility.

The tool of the invention is particularly useful with respect to removal of annular seals. However, the tool may be used in combination or to effect removal of various seal shaped elements including annular elements and elements having other distinctive shapes. The elements need not form a closed loop. For example, the elements may be semi-circular or have other configurations. The tool of the present invention, however, provides a hook element which enables engagement with a seal or other item to facilitate removal of the seal or other type item from a seat or from a seated position. As mentioned in the background, the tool of the invention is especially useful with respect to removal of seals for front wheel drive transaxles, drive shafts and the like. However, the use is not so limited. Thus, the invention, as described herein, is exemplary with respect to the preferred embodiment and the invention is to be limited only by the following claims and equivalents thereof.

What is claimed is:

1. A tool for pulling seals comprising, in combination:

an elongate handle having a manual engagement end and a seal hook member attachment end, said hook member attachment end comprising a generally flat planar member; and a seal hook member, including, (a) at least one hook element, (b) a pivot connection to the attachment end of the handle and (c) at least one connection member for engaging the handle and hook member simultaneously in one of at least two discrete rotatable positions of the hook member about the pivot connection.

2. The tool of claim 1 wherein the hook member comprises a generally flat planar plate.

3. The tool of claim 1 wherein the hook member includes first and second hook elements, each element having a unique size.

4. A tool for pulling seals comprising, in combination:

an elongate handle having a manual engagement end sand a seal hook member attachment end; and a seal hook member including, a) at least one hook element:

b) a pivot connection to the attachment end of the handle; and c) at least one connection member for engaging the handle and hook member simultaneously in one of at least two discrete rotatable positions of the hook member about the pivot connection, said handle attachment end comprising first and second spaced, generally planar plates and the seal hook member comprising a member pivotally mounted between the first and second planar plates.

5. A tool for pulling seals comprising, in combination:

an elongate handle having a manual engagement end and a seal hook member a attachment end; and a seal hook member including, a) at least one hook element;

b) a pivot connection to the attachment end of the handle; and c) at least one connection member for engaging the handle and hook member simultaneously in one of at least two discrete rotatable positions of the hook member about the pivot connection, said hook member including a plurality of openings each separately alignable with an opening in the handle attachment end, and the connection member comprising a pin member engageable simultaneously with said handle member opening and one of said hook member openings to thereby orient the hook member relative to the handle.

6. The tool of claim 5 wherein the handle defines a straight 1 near axis with the pivot connection to the hook member generally ort the axis and said handle member opening is located generally on said axis at a first radial distance from the pivot connection, and the hook member includes at least two handle member openings at said first radial distance from said pivot connection.

7. The tool of claim 5 wherein the handle member includes more than one opening for alignment with a hook member opening.

8. A tool for pulling seals comprising, in combination:

an elongate handle having a manual engagement end and a seal hook member attachment end, said hook member attachment end including a hook member pivot and at least one handle connection point at a first radial distance from the pivot; and a seal hook member including, (a) at least one hook element, (b) a pivot attachment to the handle at the hook member pivot for pivotally connecting the seal hook member and handle members, and (c) at least two hook member connection points at said first radial distance from the pivot; and a releasable connecting element cooperative simultaneously with said handle connection point and one of said hook member connection points to maintain the hook member in a fixed orientation relative to the handle, said handle comprising first and second generally flat plates and the seal hook member comprising a generally flat, third plate pivotally mounted between the first and second plates.

9. The tool of claim 8 wherein the connection points comprise at least three orientations.

10. The tool of claim 8 including at least two handle connection joints and at least two hook member connection points.

11. The tool of claim 8 including at least two unique hook elements on the hook member.

12. A tool for pulling seals comprising, in combination:

an elongate handle having a manual engagement end and a seal hook member attachment end said hook member attachment end including a hook member pivot and at least one handle connection point at a first radial distance from the pivot; and a seal hook member including, (a) at least one hook element, (b) a pivot attachment to the handle at the hook member pivot for pivotally connecting the seal hook member and handle members, and (c) at least two hook member connection points at said first radial distance from the pivot; and a releasable connecting element cooperative simultaneously with said handle connection point and one of said hook member connection points to maintain the hook member in a fixed orientation relative to the handle, said connection points comprising openings and the connecting element comprising a pin member engageable with the openings.

13. The tool of claim 12 wherein the connection points comprise at least three orientations.

14. The tool of claim 11 including at least two handle connection points and at least two hook member connection points.

15. The tool of claim 12 including at least two unique hook elements on the hook member.

* * * * *